United States Patent
Yamamoto et al.

(10) Patent No.: US 6,277,525 B1
(45) Date of Patent: Aug. 21, 2001

(54) METHOD FOR PRODUCING ELECTROLYTE AND METHOD FOR PRODUCING SECONDARY BATTERY

(75) Inventors: Tomoya Yamamoto; Soichiro Kawakami, both of Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/159,572

(22) Filed: Sep. 24, 1998

(30) Foreign Application Priority Data

Sep. 25, 1997 (JP) .................................... 9-259996

(51) Int. Cl.[7] .................................... H01M 6/16
(52) U.S. Cl. .................. 429/326; 429/313; 429/325; 429/344
(58) Field of Search .................. 429/326, 324, 429/313, 302, 306, 344, 325; 29/623.1

(56) References Cited

U.S. PATENT DOCUMENTS

| 5,024,706 | 6/1991 | Kanai et al. ............... 136/258 |
| 5,266,309 | * 11/1993 | Gardella, Jr. et al. ............ 424/78.09 |
| 5,627,079 | * 5/1997 | Gardella, Jr. et al. ............. 436/525 |
| 5,658,689 | * 8/1997 | Kawakami et al. ................ 429/194 |

FOREIGN PATENT DOCUMENTS

| 9-082359 | 3/1997 | (JP) . |
| 11-162508 | * 6/1999 | (JP) ............................ H01M/10/40 |

* cited by examiner

*Primary Examiner*—Stephen Kalafut
*Assistant Examiner*—R Alejandro
(74) *Attorney, Agent, or Firm*—Fitzpatrick, Cella, Harper & Scinto (57) ABSTRACT

A method for producing an electrolyte comprising a salt of an organofluorosilicon compound containing silicon, fluorine and carbon, which comprises the step of reacting an organosilane compound containing at least silicon and carbon, with a fluorine compound in a solvent comprising a nonaqueous solvent as a main component.

18 Claims, 4 Drawing Sheets

DISCHARGE CURVE OF SECONDARY BATTERY USING LITHIUM SALT OF ORGANOFLUOROSILICON COMPOUND OBTAINED IN EXAMPLE 1

METHOD FOR PRODUCING ELECTROLYTE AND METHOD FOR PRODUCING SECONDARY BATTERY

BACKGROUND OF THE INVENTION

1. Field of the Invention

The present invention relates to a method for producing an electrolyte for a secondary battery, in particular, a secondary battery having a long cycle life and less performance deterioration due to repeated charge and discharge, the secondary battery utilizing an intercalating reaction and a deintercalating reaction of lithium ions to charge and discharge.

2. Related Background Art

Recently, the amount of $CO_2$ gas contained in the atmosphere has increased, and it is predicted that the global warming phenomenon would progress due to a greenhouse effect. For this reason, it is difficult to construct a thermal power plant which discharges a large amount of $CO_2$ gas. Therefore, so-called load leveling is proposed as an effective utilization of electric power generated by a generator in a thermal power plant, while electric power is stored during the night in a secondary battery arranged in a general household, the stored electric power is used in the daytime, when most electric power is used, thereby leveling the load. Further, development of a secondary battery having high energy intensity is essential for electric automobiles that do not discharge air pollution substances. Furthermore, development of a high performance secondary battery that is small in size and low in weight is rapidly demanded as an electric source for portable instruments such as book type personal computers, word processors, video cameras or cellular phones.

Development of a secondary battery using, as a positive electrode material, a lithium intercalation compound which deintercalates lithium ions from interlayers, and metallic lithium as a negative electrode in reactions during charging, or a rocking chair type battery, so-called "lithium ion battery", using, as a negative electrode material, a carbon material represented by graphite which can intercalate lithium ions between interlayers of a 6-membered ring net-like plane formed by carbon atoms, has been considered to achieve a high performance secondary battery having a small size and a low weight (in the present invention, a secondary battery utilizing intercalation and deintercalation reactions of lithium ions due to charge and discharge is hereinafter called a lithium secondary battery, including a "lithium ion battery" using carbon material as a negative electrode).

However, a high capacity lithium secondary battery using metallic lithium as a negative electrode has a very short cycle life of charge and discharge, and does not yet reach a practical level. According to the investigations by the present inventors, the main cause that a cycle life of charge and discharge of a lithium secondary battery using metallic lithium as a negative electrode is very short is presumed as follows.

"Metallic lithium is reacted with impurities such as water or an organic solvent in an electrolytic solution to form an insulating film, and due to this, lithium metal grows in a dendrite (tree branch) shape by repeated charge and discharge, thereby inducing internal short circuit between a negative electrode and a positive electrode; alternatively a dissociated electrolyte is converted to a polymerization initiator, so that an organic solvent in an electrolytic solution is polymerized to increase impedance inside a battery, and decomposition of an electrolytic solution is promoted by repeated charge and discharge, thus reaching its life".

Further, where the dendrite of the lithium described above grows and a negative electrode and a positive electrode form a short circuit, energy of a battery may be consumed by the short circuit in a short period of time, thereby generating heat, or a solvent of an electrolytic solution may be decomposed to generate a gas, thereby increasing inner pressure, leading to the breakage of a battery.

On the other hand, in the above-described "lithium ion battery", a negative electrode constituted of a carbon material of graphite structure theoretically intercalates only lithium atom of at most ⅙ per carbon atom. Therefore, a secondary battery having high energy intensity comparable to a lithium primary battery when metallic lithium is used as a negative electrode material is not yet realized. If it is attempted to intercalate lithium on a carbon material negative electrode of the "lithium ion battery" in an amount exceeding the theoretical amount, in charging, lithium metal precipitates on the surface of the carbon material as a negative electrode. Similar to the case of the above-described battery using lithium metal as a negative electrode, the metallic lithium reacts with impurities such as water, or an organic solvent in an electrolytic solution to form an insulating film, and the metallic lithium grows in a dendrite (tree branch) shape by repeated charge and discharge to induce inner short circuit between a negative electrode and a positive electrode, reaching its life. Thus, practically sufficient cycle life is not yet obtained in the "lithium ion battery" that exceeds the theoretical capacity of a graphite negative electrode.

Therefore, increase in energy intensity and prolongation of cycle life are strongly demanded in a lithium secondary battery.

To achieve this demand, Japanese Patent Application Laid-Open No. 9-82359 discloses an electrolyte comprising a salt of an organofluorosilicon compound in a lithium secondary battery to reduce deterioration in performance due to repeated charge and discharge, thereby prolonging the cycle life.

SUMMARY OF THE INVENTION

The present invention has an object to produce a high performance electrolyte for a secondary battery having a long cycle life, in particular, a high performance electrolyte with less impurities in high yield, which is useful to decrease performance deterioration due to repeated charge and discharge and to improve the cycle life, in a secondary battery utilizing an intercalating reaction and a deintercalating reaction of lithium ions to charge and discharge.

The present invention provides a method for producing an electrolyte comprising a salt of an organofluorosilicon compound containing silicon, fluorine and carbon, which comprises the step of reacting an organosilane compound containing at least silicon and carbon with a fluorine compound in a solvent comprising a nonaqueous solvent as a main component.

The present invention further provides a method for producing a secondary battery utilizing an intercalating reaction and a deintercalating reaction of lithium ions to charge and discharge and having a structure such that at least a positive electrode, a negative electrode and a separator are incorporated in a battery housing, which comprises the step of reacting an organosilane compound containing at least silicon and carbon with a fluorine compound in a solvent comprising a nonaqueous solvent as a main component to obtain an electrolyte comprising a salt of an organofluorosilicon compound containing silicon, fluorine and carbon, the electrolyte being arranged in a battery housing.

DETAILED DESCRIPTION OF THE PREFERRED EMBODIMENTS

In a method for producing an electrolyte according to the present invention, the organosilane compound and fluorine compound are reacted in a solvent comprising a nonaqueous solvent as a main component, making it possible to produce an electrolyte with small impurities in high yield. This is considered as follows. Since a few anions such as hydroxyl ions exist in the solvent comprising a nonaqueous solvent as a main component, the proportion of fluorine ions which are anions, and hydroxyl ions or the like that undergo competitive reaction is decreased at the stage of reaction substituting a fluorine ion for a substituent of organosilane compound, and substitution reaction of fluorine proceeds preferentially, so that formation of impurities can be decreased. Further, it is considered that since the solvent comprising a nonaqueous solvent as a main component originally has a small amount of ions present in the solvent, it is difficult to cause an interaction between fluorine ion and other ions, and as a result, the substitution reaction efficiently occurs by increasing free fluorine ions, thereby increasing the yield. In addition, when an aprotic solvent is used comprising a nonaqueous solvent as a main component, the anions in the solvent can be substantially lost, and as a result, it is possible to further decrease impurities. Further, if a nonaqueous solvent which can dissolve the organosilane compound and fluorine compound is used, concentration of a monomolecular organosilane compound and fluorine ions is further increased. As a result, the substitution reaction occurs more efficiently, making it possible to increase the yield.

Even where, as the organosilane compound, a compound already having fluorine as a substituent for silicon is used, it is considered that since the amount of other anions present in the nonaqueous solvent is small, similar to the above, it is difficult to cause the elimination of fluorine ions, whereby formation of impurities be suppressed.

The thus obtained electrolyte comprising a salt of the organofluorosilicon compound containing at least silicon, fluorine and carbon is difficult by itself to adsorb water. Therefore, where such an electrolyte is used in a secondary battery, particularly a secondary battery utilizing an intercalating reaction and a deintercalating reaction of lithium ions to charge and discharge, it is easy to control a water content in an electrolytic solution to lower the concentration. As a result, a reaction between a metal such as lithium precipitated in a charging reaction and water is suppressed, and this makes it possible to prolong the cycle life of a nonaqueous secondary battery. Further, since the above electrolyte has low catalyst activity as an initiator for a polymerization reaction and polymerization of the solvent in an electrolytic solution can be suppressed, the cycle life of charge and discharge can be prolonged in a nonaqueous secondary battery using this electrolyte.

In the step of reacting the organosilane compound containing at least silicon and carbon with the fluorine compound in the solvent comprising a nonaqueous solvent as a main component in the production method of the present invention, it is believed that the reaction scheme of, for example, the following reaction formula (1) or (2) proceeds:

$$R_n SiX_{4-n} + (4-n+m)MF \rightarrow M_m[R_n SiF_{4-n+m}] + (4-n)MX \qquad (1)$$

(A)

(A) . . . Solvent comprising nonaqueous solvent as a main component

$$R_n SiF_{4+n} + mMF \rightarrow M_m[R_n SiF_{4+n-m}] \qquad (2)$$

(B)

(B) . . . Solvent comprising nonaqueous solvent as a main component

In the reaction formulae, $R_n SiX_{4+n}$ and $R_n SiF_{4+n}$ are organosilane compounds, wherein R represents an alkyl group, an aryl group, an alkenyl group, an alkynyl group or the like, and X represents a halogen group, a hydroxyl group, an alkoxyl group, an acyloxy group, an allenoxy group, an amino group, a hydrogen atom or the like, provided that if two or more of R or X are present, Rs and Xs may have different groups. MF is, for example, a fluorine compound, wherein M represents a metal (ion), ammonium group. n is 1 to 3, and m is 1 or 2.

$R_n SiF_{4-n}$ used in the reaction formula (2) can be prepared by reacting the organosilane compound and fluorine compound in the solvent comprising a nonaqueous solvent as a main component in the following reaction formula (3).

$$R_n SiX_{4-n} + (4-n)MF \rightarrow R_n SiF_{4+n} + (4-n)MX \qquad (3)$$

(C)

(C) . . . Solvent comprising nonaqueous solvent as a main component

Thus, in the method of the present invention, reactions of, for example, the reaction formulae (1) to (3) proceed in the step of reacting the organosilane compound and the fluorine compound in the solvent comprising a nonaqueous solvent as a main component, thereby finally obtaining an electrolyte comprising a salt of the organofluorosilicon compound containing silicon, fluorine and carbon (a salt comprising, for example, lithium salt, sodium salt, potassium salt, ammonium salt and quaternary ammonium salt, represented by the general formula $[R_n SiF_{4-n+m}]$), and a mixture of those salts. The electrolyte comprising a salt of the organofluorosilicon compound containing at least silicon, fluorine and carbon is absorbs water with difficulty as described before, and also suppresses the reaction between a metal such as lithium precipitated in a charging reaction and water in using it as an electrolyte of a lithium secondary battery. As a result, the cycle life of the nonaqueous secondary battery can be prolonged.

A salt of the organofluorosilicon compound having an aryl group such as a phenyl group is easily dissolved in an organic solvent. As a result, an electrolyte having higher ion conductivity can be obtained. In particular, in a lithium secondary battery using this electrolyte, an internal impedance can be decreased, making it possible to apply larger current, and a the cycle life of charge and discharge is prolonged.

One practical embodiment of the method for producing an electrolyte according to the present invention is described as follows. In this practical embodiment, the organosilane compound and fluorine compound are stirred in the solvent comprising a nonaqueous solvent as a main component to conduct the reaction, thereby synthesizing the objective organofluorosilicon compound. The representative example of production steps is explained in detail below by referring to FIG. 1.

Figure 1:
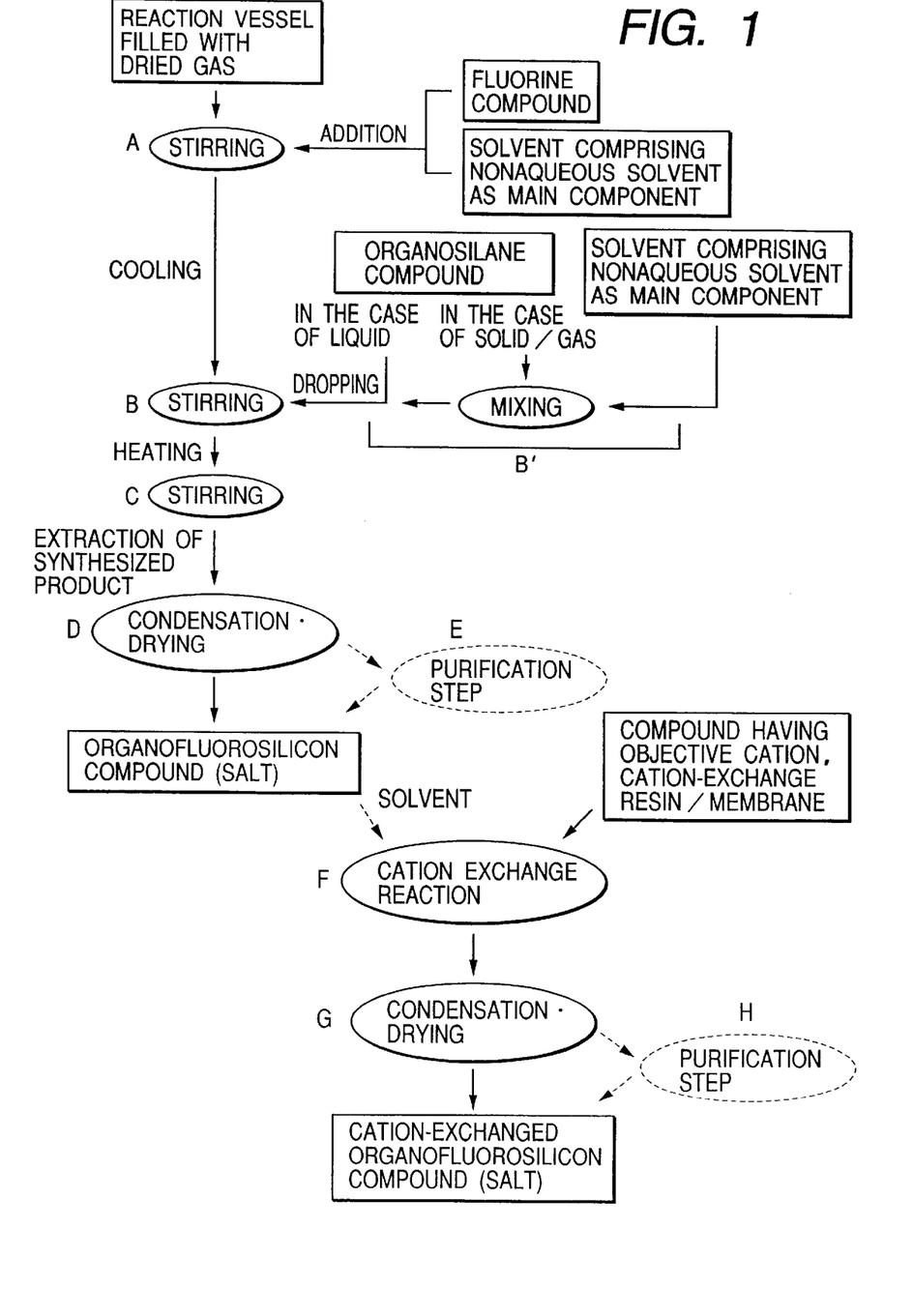
FIG. 1 is a view explaining one embodiment of the production method of the present invention.

Dried air, preferably dried nitrogen or inert gas, is filled in a closed vessel equipped with a refluxing device and a stirring device. A fluorine compound and a solvent comprising a nonaqueous solvent as a main component are introduced in the vessel, followed by stirring (Step A), an organosilane compound is added in a small amount (Step B), stirring is continued (Step C), and the reaction of the organosilane compound containing at least silicon and carbon, and the fluorine compound proceeds as shown in, for example, the reaction formulae (1) to (3) described above. After the above reaction, a synthesized product is extracted, condensed and dried (Step D) by the conventional methods, and preferably a purification step is conducted (Step E), thereby obtaining an electrolyte comprising a salt of the organofluorosilicon compound.

In this reaction, the reaction vessel is preferably heated or cooled to maintain the temperature constant. The temperature is preferably controlled to 100° C. or lower. In the case of using a compound having a group with high substitution reactivity, such as halogen or alkoxyl group, as a substituent for silicon element, for the organosilane compound, it is more preferable to cool the reaction vessel in the initial stage of the reaction, and to raise the temperature in the latter stage of the reaction. Further, in adding (dropwise) the organosilane compound (Step B), the organosilane compound which is dissolved in the solvent comprising a nonaqueous solvent as a main component, used in the reaction if the organosilane compound is solid or gas, or the organosilane compound as is if it is liquid, is preferably added in small portion by means of, for example, dropwise addition (Step B').

In reacting the organosilane compound and the fluorine compound in the solvent comprising a nonaqueous solvent as a main component (particularly Steps B to C), it is sufficient to use the fluorine compound in an amount corresponding to the amount for only synthesizing a salt of the organofluorosilicon compound to the organosilane compound, but if the fluorine compound is used in an excess amount, the yield is increased, which is preferable. The amount of the fluorine compound used is preferably 100 to 300%, and more preferably 100 to 200%, in molar ratio to the organosilane compound. The amount of the solvent comprising a nonaqueous solvent as a main component is not particularly limited, but where the organosilane compound or a fluorine compound, by the use of which a substitution reaction rapidly proceeds, is used, it is preferable to increase the amount of a solvent. The amount of a solvent used is preferably adjusted such that weight molar concentration of the organosilane compound is 1 mol/kg or less.

If the reaction conditions are controlled such that the amount of fluorine as a substituent for silicon element of a salt of the synthesized organofluorosilicon compound is 3 or less per one silicon element, the thermal decomposition of the organofluorosilicon compound during condensation and drying after the reaction can be suppressed, and this is preferred from the standpoints of yield and impurities.

If a step of exchanging cations of a salt of the obtained organofluorosilicon compound with other ion species is conducted after reacting the organosilane compound and the fluorine compound (Step F), impurity salts, having different ionizaton numbers than a salt of the organofluorosilicon compound produced at the stage of the reaction of the organosilane compound, and the fluorine compound can be decreased, which is preferable. In particular, if a salt of the organofluorosilicon compound having an ammonium ion or a quaternary ammonium ion such as $(C_4H_9)_4N^+$, as a cation is obtained in Steps A to D (or E) and the cation is exchanged with an alkali metal ion such as $Li^+$, $Na^+$, $K^+$ or the like in Step F, impurity salts having different ionization numbers are efficiently decreased, and in addition to this, a salt of the organofluorosilicon compound can be obtained. In particular, exchanging with $Li^+$ ions is more preferable in that impurities are most decreased.

An exchange reaction of the ion species in Step F proceeds by the following reaction formula (4).

$$M_m[R_nSiF_{4-n+m}]+mM'^+ \rightarrow M'_m[R_nSiF_{4-n+m}]+mM^+ \qquad (4)$$

Cation exchange resin wherein M' is Li, Na, K or the like.

After the ion exchange reaction, synthesized product is extracted, condensed and dried by conventional methods (Step G), and more preferably a purification step is conducted (Step H), thereby obtaining an electrolyte comprising a salt of the organofluorosilicon compound having been subjected to ion exchange.

Conventional ion exchange means can be used in the ion exchange method. However, a method of directly exchanging with a cation exchange resin or film, a method of exchanging with hydrogen by a cation exchange resin or film and then neutralizing with the objective cation, thereby performing the exchange, and a method of mixing with a salt containing the objective ion in a solvent and performing a cation exchange by utilizing ion intensity or precipitate generation can efficiently decrease impurity salts having different ionization numbers, and are therefore preferable.

Each material used in the reaction of the organosilane compound and the fluorine compound in a series of the steps described above is explained in detail below.

(Solvent Comprising a Nonaqueous Solvent as a Main Component)

The solvent used in the production method of the present invention is a nonaqueous solvent, i.e., solvent comprising a other than water as a main component, and a solvent containing only a slight amount of water is used. The nonaqueous solvent content in the solvent is preferably 95% by weight or more. If a solvent which does not contain water at all is used, formation of impurities is further decreased, which is more preferable.

If a solvent which can dissolve the organosilane compound containing silicon and carbon, and the fluorine compound is used, an electrolyte is obtained in high yield, which is preferable. The solvent which can dissolve the organosilane compound and the fluorine compound is preferably has a large relative dielectric constant. If the relative dielectric constant is 3 or more (at a solvent temperature of 20° C.), such a solvent can better dissolve a large amount of the organosilane compound and the fluorine compound, particularly a compound containing fluorine which generally has poor solubility in an organic solvent. As a result, the yield of an electrolyte that is a synthesized product is increased, which is preferable. The relative dielectric constant used herein means a value that a dielectric constant of an insulating material such as a solvent is compared with electric constant 1 in vacuum, and is represented by the following equation.

$$\in = C/C_0$$

wherein $\in$ is a relative dielectric constant, C is an electrostatic capacity where an insulating material is inserted in a capacitor, and $C_0$ is an electrostatic capacity where an insulating material is not inserted in a capacitor, and the capacitor is vacated to vacuum.

If an aprotic solvent having a small amount of other anions which induce a competing reaction with the fluorine ion at the stage of synthesizing reaction of electrolyte is used, formation of impurities is suppressed, which is more preferable. The preferable aprotic solvents which can be used include ethers, ketones, esters, amides, nitrites, amines, halogen compounds, nitro compounds, and sulfur compounds. Preferable examples of the aprotic solvent include diethyl ether, diisopropyl ether, tetrahydrofuran, tetrahydropiran, 1,2-methoxyethane, diethylene glycol dimethyl ether, acetone, ethyl methyl ketone, cyclohexanone, ethyl acetate, butyl acetate, ethylene carbonate, propylene carbonate, dimethyl carbonate, formamide, N,N-dimethyl formamide, N,N-dimethyl acetamide, 1,3-dimethyl-2-imidazolidinone, N-methyl pyrrolidone, acetonitrile, propionitrile, succinonitrile, benzonitrile, ethylene diamine, triethylene amine, aniline, pyridine, piperidine, morpholine, methylene chloride, chloroform, 1,2-dichloroethane, chlorobenzene, 1-bromo-2-chloroethane, nitromethane, nitrobenzene, o-nitrotoluene, dimethylsulfoxide, and sulforan. Those solvents can be used alone or as a mixture of two or more thereof.

(Organosilane Compound)

The organosilane compound containing at least silicon and carbon used in the present invention is a silane compound having at least one silicon and that at least one carbon is bonded to silicon. A silane compound ($R_nSiX_{4-n}$ described before, for example) having four substituents (in the present invention, a group which bonds to silicon is called "substituent") bonded to silicon has good reactivity, and is thus preferable in improving the yield.

A silane compound having 1 to 3 substituents which tend to cause a substitution reaction with a fluorine ion in four substituents of silicon is preferable, and a silane compound already having fluorine as a substituent is more preferable. Examples of the substituent (X in the above formula) easily cause a substitution reaction with the fluorine ion include a halogen such as —Cl, —Br or —I, a hydroxyl group such as —OH, an alkoxy group such as —OCH$_3$, —OC$_2$H$_5$ or —OC$_4$H$_9$, an acyloxy group such as —OCOCH$_3$ or —OCOC$_2$H$_5$, an allenoxy group such as —OC$_6$H$_5$, —OC$_6$H$_4$CH$_3$ or —OC$_{10}$OH$_7$, an amino group such as —NR$^1$H or —NR$^1$R$^2$ (R$^1$ and R$^2$=alkyl group) and —H (hydrogen).

Further, if the fluorine compound has a substituent that does not easily cause a substitution reaction with the fluorine ion as the remaining substituent (R in the above formula) good solubility in an organic solvent can be maintained during the substitution reaction, and the reaction proceeds efficiently, which is preferable. The substituent R that does not easily cause substitution reaction with the fluorine ion has carbon is directly bonded to silicon. An alkyl group such as —CH$_3$, —C$_2$H$_5$ or —C$_4$H$_9$, and an aryl group such as —C$_6$H$_5$, —C$_6$H$_4$CH$_3$ or —C$_{10}$H$_7$ do not easily cause a reaction with the fluorine ion, and thus the fluorine ion is effectively used in the substitution reaction. Therefore, those groups are preferable. Of those, a phenyl group is more preferable regarding solubility.

Further, in the case where the substituent is an alkenyl group or an alkynyl group, having an unsaturated bond such as a double bond or a triple bond, such as —C$_2$H$_3$, —C$_4$H$_7$, —C$_2$H or —C$_3$H$_3$, a compound having this substituent can be employed after it is reacted with the fluorine compound, and then the substituent undergoes other reactions such as addition reaction.

(Fluorine Compound)

The fluorine compound used in the present invention is a compound which can form a fluorine ion (e.g., MF described before). For example, inorganic or organic fluorine compounds such as hydrogen fluoride, fluorine gas, xenon fluoride, sulfur tetrafluoride, perchloryl fluoride, cesium sulfate fluoride, hypofluorites, N-fluoroammoniums or fluoride salts can be used. A quaternary ammonium salt fluoride such as tetraethyl fluoride or tetrabutyl fluoride, and fluoride salts such as ammonium fluoride, lithium fluoride, sodium fluoride or potassium fluoride are more preferable from the point of handling and safety. Of those, an ammonium fluoride salt (particularly, NH$_4$F and a quaternary ammonium salt represented by the general formula R$^3{}_4$NF wherein R$^3$ is alkyl group) has particularly good solubility in a nonaqueous solvent, and is therefore more preferable.

The production method of the electrolyte according to the present invention is described above. Using the electrolyte thus synthesized, a secondary battery is produced by the conventional method. One practical embodiment of a lithium secondary battery using the electrolyte synthesized by the production method of the present invention is explained below by referring to FIGS. 3, 4 and 5.

Figure 3:
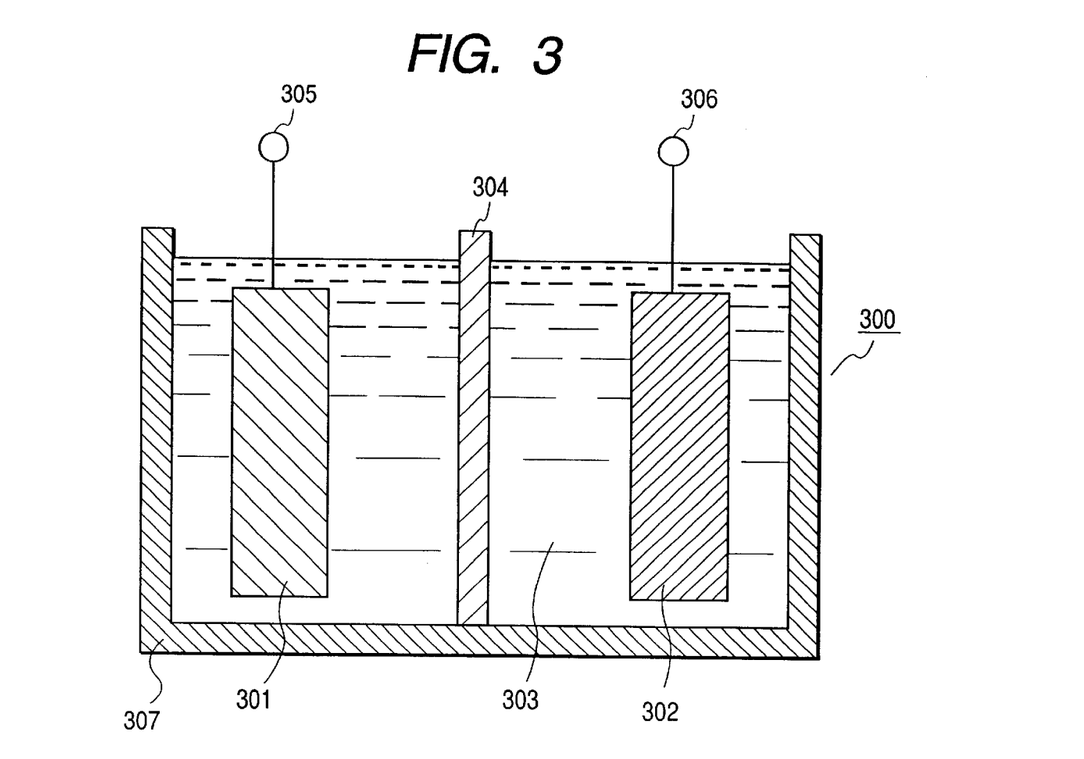
FIG. 3 is a cross sectional view showing one embodiment of a structure of the lithium secondary battery using the electrolyte obtained by the production method of the present invention.

FIG. 3 is a cross sectional view showing an outline of a structure of a secondary battery. A secondary battery 300 shown in FIG. 3 has a structure where a negative electrode 301 and a positive electrode 302 are oppositely arranged through an electrolyte or an electrolytic solution (electrolyte solution) 303 and a separator 304, and those members are incorporated in a battery housing 307. A salt of the organofluorosilicon compound synthesized by the method of the present invention is used for this electrolyte 303. The negative electrode 301 is connected to an input/output terminal 305, and the positive electrode 302 is connected to an input/output terminal 306.

(Method of Using Electrolyte)

A method of using the electrolyte (303) synthesized by the method of the present invention includes the following three methods:

(1) a method of using the electrolyte as it is;
(2) a method of using the electrolyte as a solution dissolved in a solvent; and
(3) a method of using the electrolyte as a solidified material by adding a gelling agent such as a polymer to a solution.

In general, the electrolytic solution obtained by dissolving the electrolyte in a solvent is used by maintaining the same in a porous separator. The electrolyte synthesized by the production method of the present invention is desirably subjected to sufficient dehydration and deoxidation by heating under reduced pressure.

Examples of the solvent for the electrolyte, which can be used include acetonitrile, benzonitrile, propylene carbonate, ethylene carbonate, dimethyl carbonate, diethyl carbonate, dimethyl formamide, tetrahydrofuran, nitrobenzene, dichloroethane, diethoxyethane, 1,2-dimethoxyethane, chlorobenzene, γ-butyrolactone, dioxolane, sulfolane, nitromethane, dimethylsulfide, dimethylsulfoxide, methyl formate, 3-methyl-2-oxidazolinone, 2-methyltetrahydrofuran, 3-propylsydnone, sulfur dioxide, phosphoryl chloride, thionyl chloride, sulfuryl chloride, and mixtures thereof.

The above solvent is preferably dehydrated with active alumina, molecular sieve, phosphorus pentoxide, calcium chloride or the like, or depending on the solvent, is preferably dehydrated by distilling in an inert gas in the presence of an alkali metal, thereby simultaneously removing impurities.

Gelation is preferably conducted in order to prevent leakage of the electrolytic solution. The gelling agent used preferably is a polymer which absorbs a solvent of the electrolyte and swells. Such a polymer used includes polyethylene oxide, polyvinyl alcohol and polyacryl amide. The electrolyte obtained in the present invention is particularly used for an electrolyte in a lithium secondary battery. The electrolyte can suppress a reaction between a metal such as lithium precipitated in charge reaction as described above, and therefore can prolong the cycle life of a nonaqueous secondary battery.

Each member of the secondary battery shown in FIG. 1 is explained below.

(Positive Electrode)

The positive electrode (301) used in a lithium secondary battery is constituted of a collector, a positive electrode active material, a conductive auxiliary agent, a binder, and the like. This positive electrode is prepared by molding a mixture of the positive electrode active material, the conductive auxiliary agent, the binder on a surface of the collector, and the like.

As the positive electrode active material generally used is a transition metal oxide, a transition metal sulfide, a lithium-transition metal oxide or a lithium transition metal sulfide. Examples of the transition metals for the transition metal oxide or transition metal sulfide include Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au, which are elements partially having d shell or f shell. In particular, Ti, V, Cr, Mn, Fe, Co, Ni and Cu which are the first transition series metals are preferably used.

Examples of the conductive auxiliary member used in the positive electrode include amorphous carbon called carbon black, such as graphite or Ketchen black or acetylen black, and metal powder such as nickel. Examples of the binder used in the positive electrode include polyolefins such as polyethylene or polypropylene, and fluorine resin such as polyvinylidene fluoride or tetrafluoroethylene polymer.

The collector for the positive electrode acts to efficiently supply electric current consumed in electrode reaction during charging or to collect electric current generated during discharging. Therefore, material for forming the collector for positive electrode preferably is a material having high electroconductivity and also inert to a battery reaction. Examples of the preferable material include nickel, stainless steel, titanium, aluminum, copper, platinum, palladium, gold, zinc, various alloys, and composite metals of two or more kinds of those as described previously. The shape of the collector, for example, which can be used is plate-like, foil-like, mesh-like, sponge-like, fiber-like, punching metal-like, expanded metal-like, or the like shape. In the negative electrode (302) used in a lithium secondary battery, the negative electrode active material which is a host material of a lithium ion is a carbon material including graphite, lithium metal, lithium alloy, material having metal element which forms an alloy with lithium, porous metal, and transition metal oxide having an electromotive force together with the positive electrode active material. Where the negative electrode material is powder, the binder is used, or the powder is sintered and the negative electrode active material layer is formed on the collector to prepare the negative electrode. Where the negative electrode active material powder has low electroconductivity, it is appropriately necessary to mix the conductive auxiliary agent, as well as to form the active material layer for positive electrode. The same materials used in the positive electrode can be used as the collector and conductive auxiliary member.

(Separator)

The separator acts to prevent a short circuit between the negative electrode and the positive electrode. Further, the separator may act to maintain the electrolytic solution (303).

It is required for the separator to have pores in which lithium ions can migrate and also to be insoluble in the electrolytic solution. Therefore, materials for the separator preferably used are non-woven fabrics of, for example, glass, polyolefins such as polypropylene or polyethylene, or fluororesin, materials having a microporous structure, and the like. A metal oxide film having micropores or a metal oxide-composite resin film can also be used. In particular, where a metal oxide film having multilayered structure is used, a dendrite is difficult to pass through, which is effective in preventing a short circuit. Where a fluororesin film which is a flame retardant, glass which is an incombustible material, or a metal oxide film is used, safety is improved.

(Shape and Structure of Battery)

As the shape of secondary battery, the structure shown in FIG. 3 is a basic structure, and the representative shapes include flat, cylindrical, rectangular and sheet. Further, the structure of members in the battery is single layer type, multilayer type, spiral type, and the like. Of those, a spiral type cylindrical battery has the characteristics that an electrode area can be increased by interposing the separator between the negative electrode and the positive electrode, and large electric current can pass during charging and discharging. A rectangular-shape or sheet-shape battery has the characteristic that a space for incorporating instruments which incorporate a battery is effectively utilized.

Figure 4:
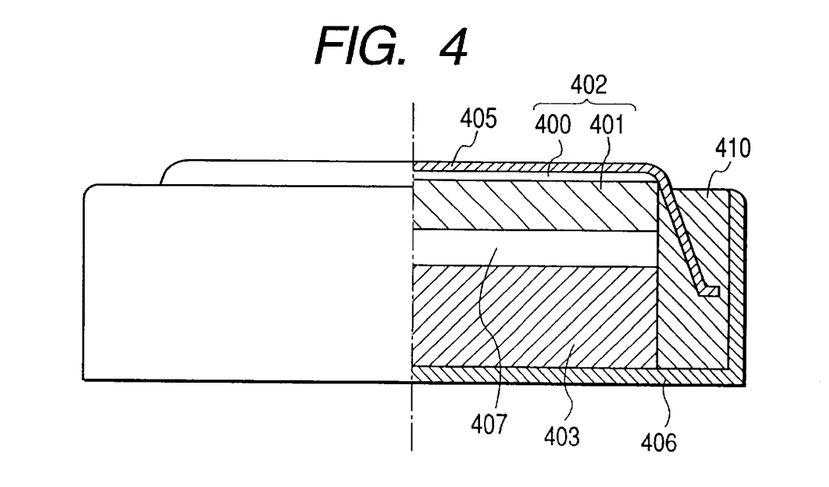
FIG. 4 is a cross sectional view of a single layer type flat battery.
Figure 5:
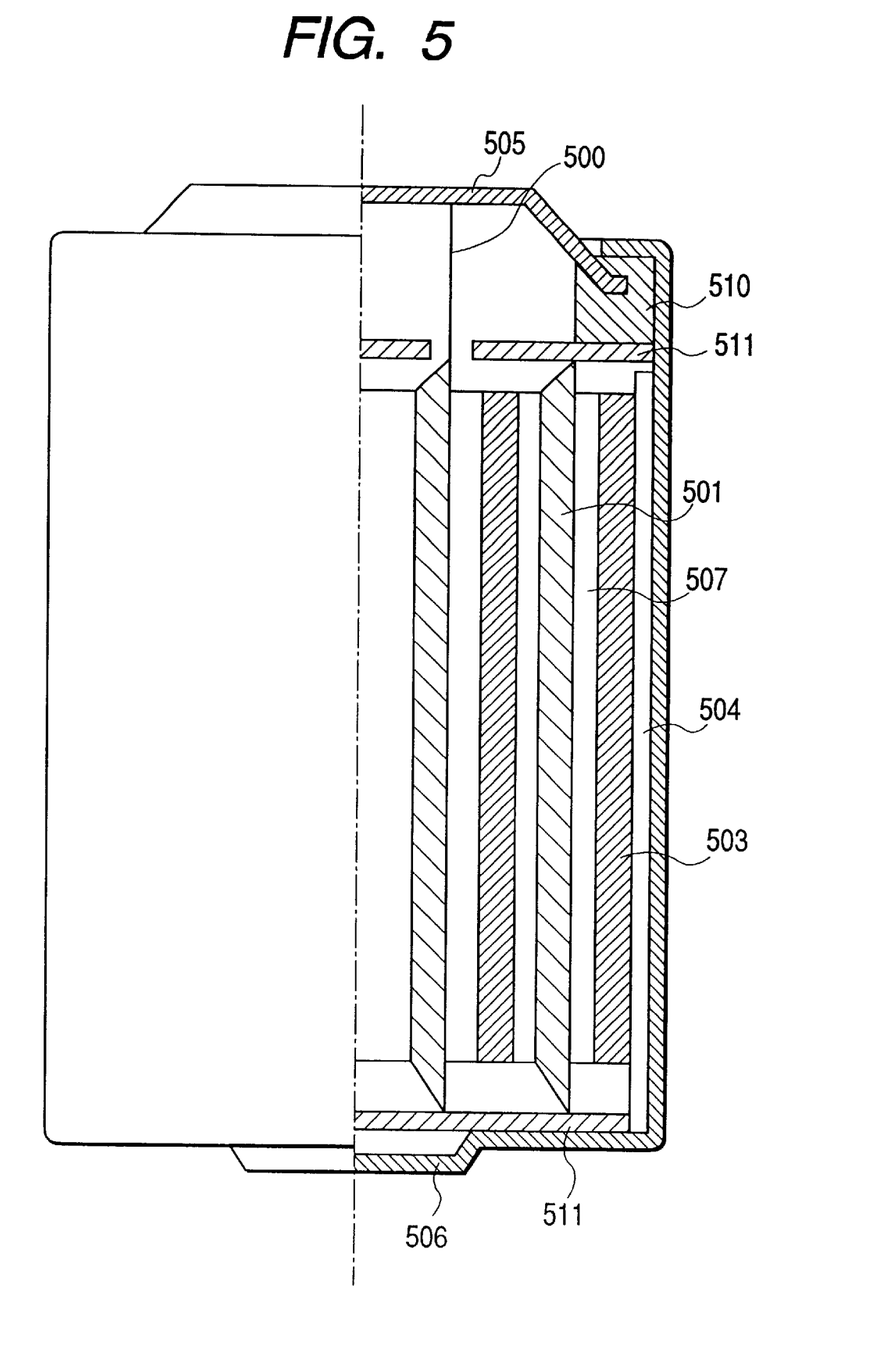
FIG. 5 is a cross sectional view of a spiral type cylindrical battery.

The shape and structure of the battery are explained in detail below by referring to FIGS. 4 and 5. FIG. 4 is a sectional view of a single layer type flat-shape (coin-like) battery, and FIG. 5 is a sectional view of a spiral type cylindrical battery. Those lithium batteries basically have the same structure as shown in FIG. 3, and comprise a negative electrode, a positive electrode, an electrolyte, a separator, a battery housing, an output terminal, and the like.

In FIGS. 4 and 5, reference numerals 400 and 500 are negative electrode collectors, 401 and 501 are negative electrode active materials, 403 and 503 are positive electrode active materials, 405 and 505 are negative electrode terminals (negative electrode caps), 406 and 506 are positive electrode cans, 407 and 507 are separators which maintain an electrolytic solution, 410 and 510 are insulating packings, and 511 is an insulating plate. In the lithium secondary battery having a flat structure shown in FIG. 4, a laminate in which the positive electrode containing the positive electrode active material 403 and the negative electrode containing the negative electrode active material 401 and the negative electrode collector 400 are laminated through at least the separator 407 that maintains an electrolyte comprising a salt of the organofluorosilicon compound containing at least silicon, fluorine and carbon, synthesized above is incorporated in the positive electrode can 406 from the positive electrode side, and the negative electrode side is covered with the negative electrode terminal (the negative electrode cap) 405. Other portion in the positive electrode can have, for example, an insulating material arranged therein (insulating packing 410).

In the cylindrical lithium secondary battery shown in FIG. 5, at least the separator 507 which maintains an electrolyte comprising a salt of the organofluorosilicon compound containing at least silicon, fluorine and carbon, synthesized above, is interposed between the positive electrode containing the positive electrode active material 503 and the negative electrode containing the negative electrode active material 501, and a laminate having a cylindrical structure obtained by multiply winding around a predetermined axis as a center is incorporated in the positive electrode can 506 from its side and one bottom side. The other bottom (upper side) side of the laminate is covered with the negative electrode terminal (negative electrode cap) 505. Another portion in the positive electrode can has an insulating material arranged therein (insulating packing 510). One embodiment of fabrication method of the battery shown in FIG. 4 or 5 is explained below.

(1) The separator (407, 507) is interposed between the negative electrode active material layer (401, 501) and the molded positive electrode material layer (403, 503), and such a laminate is incorporated in the positive electrode can (406, 506).

(2) After pouring the electrolyte, the negative electrode cap (405, 505) and the insulating packing (410, 510) are fabricated.

(3) By caulking above (2), a battery is completed.

The preparation of materials for the lithium battery and fabrication of the battery as described above are preferably conducted in dried air from which moisture is sufficiently removed, or in dried inert gas.

(Insulating Packing)

Material for a gasket (410, 510) which can be used is fluororesin, polyamide resin, polysulfone resin, various rubbers and the like. Glass tube sealing, adhesive, welding, soldering and the like other than the "caulking" using the insulating packing as in FIGS. 4 and 5 can be used as a sealing method of battery.

Further, various organic resin materials or ceramics are used as a material for the insulating plate shown in FIG. 5.

(Outer Can)

Outer can of the battery is constituted of the positive electrode can (406, 506) and the negative electrode cap (405, 505). Stainless steel is preferably used as a material for the outer can. In particular, titanium clad stainless steel plate, copper clad stainless steel plate or nickel plated steel plate is widely used.

In the embodiment shown in FIGS. 4 and 5, the positive electrode can (406, 506) also has the function of the battery housing. Therefore, the above-described stainless steel is preferably used. However, where the positive electrode does not have the function of the battery housing, material for the battery housing used is metal such as zinc other than stainless steel, plastic such as polypropylene, or a composite material of metal or glass fiber, and plastic.

(Safety Valve)

The lithium secondary battery is equipped with a safety valve as a safety measure when inner pressure of battery is increased. Although not shown in FIGS. 4 and 5, rubber, spring, metal ball, bursting foil, or the like can be used as the safety valve.

The present invention is described in more detail by reference to the following Examples, but it should be understood that the invention is not construed as being limited thereto. Unless otherwise indicated, all parts and percents are based on weight.

EXAMPLE 1

(Synthesis of Salt of Organofluorosilicon Compound)

A reaction vessel of a three-necked flask equipped with a refluxing device, a stirring device and a dropping funnel was filled with dried nitrogen gas. 10.4 Parts (0.04 mol) of tetra n-butylammonium fluoride, (n—Bu)4NF, (purity 99%) from which moisture had been removed by vacuum drying at 50° C. and 100 parts of diethyl ether (purity 99.5%) dried with molecular sieve 3A were introduced in the three-necked flask, and the resulting mixture was stirred until tetra n-butylammonium fluoride was dissolved. As a result of measuring a water content in diethyl ether after drying with molecular sieve with Karl Fischer's moisture meter, it was 0.5%. Further, as a result of measuring the relative dielectric constant of diethyl ether after drying with the molecular sieve with Impedance Analyzer (manufactured by HP Co.), it was 4.3 (20° C.).

15.5 Parts (0.02 mol) of triphenyl chlorosilane $Ph_3SiCl$ from which moisture had been removed by vacuum drying at 50° C. were dissolved in 100 parts of the same dried diethyl ether as used above, and this solution was introduced in a dropping funnel of the reaction vessel.

The reaction vessel was cooled to 0° C. with an ice bath, and the solution in the dropping funnel was gradually added dropwise to the vessel while stirring the content in the reaction vessel. After addition, stirring was continued at 0° C. for 1 hour. The reaction vessel was heated to 50° C., and stirring was further continued for 2 hours.

After completion of the reaction, diethyl ether of the solvent was condensed with a rotary evaporator, and dried. Crystals thus obtained were washed with cold water to remove tetra n-butylammonium chloride of a by-product, thereby obtaining the objective tetra n-butylammonium triphenyl difluorosilicate salt, $(n-Bu)_4N(Ph_3SiF_2)$ (Ion Exchange of Salt of Organofluorosilicon Compound)

The tetra n-butylammonium triphenyl difluorosilicate salt obtained above and lithium tetrafluoroborate $LiBF_4$ (purity 98%) were dissolved in acetone, and the resulting solution was condensed with a rotary evaporator after stirring for 2 hours, and dried. Crystals thus obtained were washed with cold water to remove tetra n-butylammonium tetrafluoroborate salt as a by-product, thereby obtaining the objective lithium triphenyl difluorosilicate salt $Li(Ph_3SiF_2)$.

Comparative Example 1

(Synthesis of Salt of Organofluorosilicon Compound)

Treatment was conducted in the same manner as in Example 1 except that a mixed aqueous solution of diethyl ether/water (10%:90%) was used in place of dried diethyl ether, to obtain tetra n-butyl ammonium triphenyl difluorosilicate salt $(n-Bu)_4N(Ph_3SiF_2)$.

EXAMPLE 2

(Synthesis of Salt of Organofluorosilicon Compound)

A reaction vessel of a three-necked flask equipped with a refluxing device, a stirring device and a dropping funnel was filled with dried nitrogen gas in the manner as in Example 1. 9.0 Parts (0.06 mol) of tetraethylammonium fluoride, $Et_4NF$, (purity 99%) from which moisture had been removed by vacuum drying at 50° C. and 80 parts of dimethyl sulfoxide (purity 99%) dried with molecular sieve 3A were introduced in the three-necked flask, and the resulting mixture was stirred until tetraethylammonium fluoride was dissolved. As a result of measuring a water content in dimethyl sulfoxide after drying with molecular sieve with Karl Fischer's moisture meter, it was 0.05%. Further, as a result of measuring the relative dielectric constant of dimehtyl sulfoxide after drying with molecular sieve with Impedance Analyzer, it was 48.9 (20° C.).

5.1 Parts (0.02 mol) of diphenyl dichlorosilane $Ph_2SiCl_2$ from which moisture had been removed by vacuum drying at 50° C. were dissolved in 80 parts of the same dried dimethyl sulfoxide as used above, and this solution was introduced in a dropping funnel of the reaction vessel.

The objective tetraethylammonium diphenyl trifluorosilicate salt $Et_4N(Ph_2SiF_3)$ was obtained in the same manner as in Example 1.

(Ion Exchange of Salt of Organofluorosilicon Compound)

The tetraethylammonium diphenyl trifluorosilicate salt obtained above and lithium perchlorate $LiClO_4$ (purity 98%) were dissolved in acetone, and the resulting solution was condensed with a rotary evaporator after stirring for 2 hours, and dried. Crystals thus obtained were washed with cold water to remove tetraethylammonium perchlorate salt as a by-product, thereby obtaining the objective lithium diphenyl trifluorosilicate salt $Li(Ph_2SiF_3)$.

Comparative Example 2

(Synthesis of Salt of Organofluorosilicon Compound)

Treatment was conducted in the same manner as in Example 2 except that a mixed aqueous solution of dimethyl sulfoxide/water (30%:70%) was used in place of dried dimethyl sulfoxide, to obtain tetraethylammonium diphenyl trifluorosilicate salt $Et_4N(Ph_2SiF_3)$.

EXAMPLE 3

(Synthesis of Salt of Organofluorosilicon Compound)

A reaction vessel of a three-necked flask equipped with a refluxing device, a stirring device and a dropping funnel was filled with dried nitrogen gas in the manner as in Example 1. 3.7 Parts (0.1 mol) of ammonium fluoride, $NH_4F$, (purity 97%) from which moisture had been removed by vacuum drying at 50° C. and 100 parts of acetonitrile (purity 99.5%) dried with molecular sieve 3A were introduced in the three-necked flask, and the resulting mixture was stirred until ammonium fluoride was dissolved. As a result of measuring a water content in acetonitrile after drying with the molecular sieve 3A with Karl Fischer's moisture meter, it was 0.1%. Further, as a result of measuring the relative dielectric constant of acetonitrile after drying with the molecular sieve with Impedance Analyzer, it was 37.5 (20° C.).

3.6 Parts (0.02 mol) of phenylmethyl dimethoxysilane $PhMeSi(OMe)_2$ from which moisture had been removed by vacuum drying at 50° C. were dissolved in 80 parts of the same dried acetonitrile as used above, and this solution was introduced in a dropping funnel of the reaction vessel.

The objective ammonium phenylmethyl trifluorosilicate salt $NH_4(PhMeSiF_3)$ was obtained in the same manner as in Example 1.

(Ion Exchange of Salt of Organofluorosilicon Compound)

The ammonium phenylmethyl trifluorosilicate salt obtained above and lithium hexafluorophosphate $LiPF_6$ (purity 99%) were dissolved in acetonitrile, and the resulting solution was condensed with a rotary evaporator after stirring for 2 hours, and dried. Crystals thus obtained were washed with cold water to remove ammonium hexafluorophosphate salt as a by-product, thereby obtaining the objective lithium phenylmethyl trifluorosilicate salt $Li(PhMeSiF_3)$.

Comparative Example 3

(Synthesis of Salt of Organofluorosilicon Compound)

Treatment was conducted in the same manner as in Example 3 except that a mixed aqueous solution of acetonitrile/water (50%:50%) was used in place of dried acetonitrile, to obtain ammonium phenylmethyl trifluorosilicate salt $NH_4(PhMeSiF_3)$.

EXAMPLE 4

(Synthesis of Salt of Organofluorosilicon Compound)

A reaction vessel of a three-necked flask equipped with a refluxing device, a stirring device and a dropping funnel was filled with dried nitrogen gas in the manner as in Example 1. 3.7 Parts (0.1 mol) of ammonium fluoride, $NH_4F$, (purity 97%) from which moisture had been removed by vacuum drying at 50° C. and 120 parts of chlorobenzene (purity 99.5%) dried with molecular sieve 3A were introduced in the three-necked flask, and the resulting mixture was stirred until ammonium fluoride was dissolved. As a result of measuring a water content in chlorobenzene after drying with the molecular sieve 3A with Karl Fischer's moisture meter, it was 0.005%. Further, as a result of measuring the relative dielectric constant of chlorobenzene after drying with the molecular sieve 3A with Impedance Analyzer, it was 5.6 (20° C.).

4.8 Parts (0.02 mol) of phenyl triethoxysilane $PhSi(OEt)_3$ from which moisture had been removed by vacuum drying at 50° C. were dissolved in 50 parts of the same dried chlorobenzene as used above, and this solution was introduced in a dropping funnel of the reaction vessel.

The objective ammonium phenyl pentafluorosilicate salt $(NH_4)_2(PhSiF_5)$ was obtained in the same manner as in Example 1.

(Ion Exchange of Salt of Organofluorosilicon Compound)

The ammonium phenyl pentafluorosilicate salt obtained above was dissolved in acetonitrile, and the resulting solution was passed through a column packed with a cation-exchange resin, Diaion SK1B. Lithium hydroxide (purity 99%) was added to this solution and stirred for 2 hours. This solution was condensed with a rotary evaporator after stirring, and dried, thereby obtaining the objective lithium phenyl pentafluorosilicate salt $Li_2(PhSiF_5)$ Comparative Example 4

(Synthesis of Salt of Organofluorosilicon Compound)

Treatment was conducted in the same manner as in Example 4 except that water was used in place of dried chlorobenzene used in Example 4, to obtain ammonium phenyl pentafluorosilicate salt $(NH_4)_2(PhSiF_5)$.

EXAMPLE 5

(Synthesis of Salt of Organofluorosilicon Compound)

A reaction vessel of a three-necked flask equipped with a refluxing device, a stirring device and a dropping funnel was filled with dried nitrogen gas in the manner as in Example 1. 2.6 Parts (0.1 mol) of lithium fluoride (purity 98%) from which moisture had been removed by vacuum drying at 50°

C. and 200 parts of moisture-absorbed methyl ethyl ketone (purity 99.5%) were introduced in the three-necked flask, and the resulting mixture was stirred. As a result of measuring a water content in methyl ethyl ketone with Karl Fischer's moisture meter, it was 3.5%. Further, as a result of measuring the relative dielectric constant of methyl ethyl ketone with Impedance Analyzer, it was 18.9 (20° C.).

4.7 Parts (0.02 mol) of ethyl triacetoxysilane EtSi(OCOCH$_3$)$_3$ dried at 50° C. were directly introduced in a dropping funnel of the reaction vessel.

The objective lithium ethyl pentafluorosilicate salt Li$_2$(EtSiF$_5$) was obtained in the same manner as in Example 1 (the ion-exchange step was not conducted).

Comparative Example 5

(Synthesis of Salt of Organofluorosilicon Compound)

Treatment was conducted in the same manner as in Example 5 except that water was used in place of methyl ethyl ketone used in Example 5, to obtain lithium ethyl pentafluorosilicate salt Li$_2$(EtSiF$_5$).

EXAMPLE 6

(Synthesis of Salt of Organofluorosilicon Compound)

A reaction vessel of a three-necked flask equipped with a refluxing device, a stirring device and a dropping funnel was filled with dried nitrogen gas in the manner as in Example 1. 15.0 Parts (0.10 mol) of tetraethylammonium fluoride, Et$_4$NF, (purity 99%) from which moisture had been removed by vacuum drying at 50° C. and 100 parts of diethyl ether (purity 99.5%) dried with molecular sieve 3A were introduced in the three-necked flask, and the resulting mixture was stirred until tetraethylammonium fluoride was dissolved. As a result of measuring a water content in diethyl ether after drying with the molecular sieve with Karl Fischer's moisture meter, it was 0.5%. Further, as a result of measuring the relative dielectric constant of diethyl ether after drying with molecular sieve with Impedance Analyzer, it was 4.3 (20° C.).

3.8 Parts (0.02 mol) of vinyl triethoxysilane CH$_2$=CHSi(OC$_2$H$_5$)$_3$ from which moisture had been removed by vacuum drying at 50° C. were dissolved in 100 parts of the same dried diethyl ether as used above, and this solution was introduced in a dropping funnel of the reaction vessel.

The objective tetraethylammonium vinyl pentafluorosilicate salt (Et$_4$N)$_2$(CH$_2$=CHSiF$_5$) was obtained in the same manner as in Example 1.

(Ion Exchange of Salt of Organofluorosilicon Compound)

The tetraethylammonium vinyl pentafluorosilicate salt obtained above and lithium perchlorate LiClO$_4$ (purity 98%) were dissolved in acetone, and the resulting solution was condensed with a rotary evaporator after stirring for 2 hours, and dried. Crystals thus obtained were washed with cold water to remove tetraethylammonium perchlorate salt as a by-product, thereby obtaining the objective lithium vinyl pentafluorosilicate salt Li$_2$(CH$_2$=CHSiF$_5$).

Comparative Example 6

(Synthesis of Salt of Organofluorosilicon Compound)

Treatment was conducted in the same manner as in Example 6 except that a mixed aqueous solution of diethyl ether/water (30%:70%) was used in place of dried diethyl ether used in Example 6, to obtain lithium pentafluorosilicate salt Li$_2$(CH$_2$=CHSiF$_5$).

(Evaluation Method)

Yield and impurity amount were measured for the respective organofluorosilicon compounds obtained in Examples 1 to 6 and Comparative Examples 1 to 6. The Examples were compared with the corresponding Comparative Examples, like Example 1 vs. Comparative Example 1 and Example 2 vs. Comparative Example 2. Yield, impurity amount, and impurity amount after ion-exchange were evaluated as described below.

As a result, all the organofluorosilicon compound salts obtained in the Examples had good yield and small amount of impurity, as compared with the Comparative Examples, as shown in TABLE 1.

TABLE 1

| | MATERIAL USED IN REACTION | | REACTION PRODUCT |
|---|---|---|---|
| EXAMPLE 1 | NONAQUEOUS SOLVENT | DIETHYL ETHER | (n-Bu)$_4$N[Ph$_3$SiF$_2$] |
| | ORGANOSILANE COMPOUND | Ph$_3$SiCl | |
| | FLUORINE COMPOUND | (n-Bu)$_4$NF | |
| EXAMPLE 2 | NONAQUEOUS SOLVENT | DIMETHYLSULFOXIDE | Et$_4$N[Ph$_2$SiF$_3$] |
| | ORGANOSILANE COMPOUND | Ph$_2$SiCl$_2$ | |
| | FLUORINE COMPOUND | Et$_4$NF | |
| EXAMPLE 3 | NONAQUEOUS SOLVENT | ACETONITRILE | NH$_4$[PhMeSiF$_3$] |
| | ORGANOSILANE COMPOUND | PhMeSi(OMe)$_2$ | |
| | FLUORINE COMPOUND | NH$_4$F | |
| EXAMPLE 4 | NONAQUEOUS SOLVENT | CHLOROBENZENE | (NH$_4$)$_2$[PhSiF$_5$] |
| | ORGANOSILANE COMPOUND | PhSi(OEt)$_3$ | |
| | FLUORINE COMPOUND | NH$_4$F | |
| EXAMPLE 5 | NONAQUEOUS SOLVENT | METHYL ETHYL KETONE | Li$_2$[EtSiF$_5$] |
| | ORGANOSILANE COMPOUND | EtSi(OCOCH$_3$)$_3$ | |
| | FLUORINE COMPOUND | LiF | |
| EXAMPLE 6 | NONAQUEOUS SOLVENT | DIETHYL ETHER | (Et$_4$N)$_2$[CH$_2$=CHSiF$_5$] |
| | ORGANOSILANE COMPOUND | CH$_2$=CHSi(OEt)$_3$ | |
| | FLUORINE COMPOUND | Et$_4$NF | |

| | YIELD*[1] | IMPURITY AMOUNT*[2] | PRODUCT AFTER ION-EXCHANGE | IMPURITY AMOUNT AFTER ION-EXCHANGE*[3] |
|---|---|---|---|---|
| EXAMPLE 1 | 4.9 | 0.1 | Li[Ph$_3$SiF$_2$] | 0.06 |
| EXAMPLE 2 | 6.1 | 0.05 | Li[Ph$_2$SiF$_3$] | 0.04 |
| EXAMPLE 3 | 4.7 | 0.1 | Li[PhMeSiF$_3$] | 0.07 |

TABLE 1-continued

| | | | | |
|---|---|---|---|---|
| EXAMPLE 4 | 4.2 | 0.2 | Li$_2$[PhSiF$_5$] | 0.09 |
| EXAMPLE 5 | 2.4 | 0.2 | — | — |
| EXAMPLE 6 | 2.3 | 0.3 | Li$_2$[CH$_2$=CHSiF$_5$] | 0.09 |

*Notes
*[1]Yield:
Weight of the salt of organofluorosilicon compound obtained in the Example was determined by comparing with the Comparative Example in the following calculation formula.
Yield = Weight of organofluorosilicon compound salt obtained in the Example/Weight of organofluorosilicon compound salt obtained in the Comparative Example
*[2]Impurity amount,
*[3]Impurity amount after ion-exchange The yield of organofluorosilicon compound salt obtained and the yield of the organofluorosilicon compound salt after ion-exchange were measured using a high performance liquid chromatography and also using a salt of tetra n-butyl ammonium p-toluenesulfonate as an internal standard reagent, and were judged by comparing with the Comparative Example in the following calculation.

Impurity amount={(1−measurement concentration of organofluorosilicon compound salt obtained in the Example)/measurement concentration of internal standard reagent)}/{(1−measurement concentration of organofluorosilicon compound salt obtained in the Comparative Example)/measurement concentration of internal standard reagent)}

Impurity amount after ion-exchange={(1−measurement concentration of organofluorosilicon compound salt after ion-exchange obtained in the Example)/measurement concentration of internal standard reagent)/(1−measurement concentration of organofluorosilicon compound salt after ion-exchange obtained in the Comparative Example)/measurement concentration of internal standard reagent}

Measurement concentration=Each area % to sum of area % of each component in high performance liquid chromatography measurement Using lithium the salt of the organofluorosilicon compound obtained in Examples 1 to 6, a coin-like secondary battery as shown in FIG. 4 was produced, and charge and discharge were conducted. Production procedure of each constituent of a battery, and fabrication method of the battery are explained below.

(Preparation of Electrolytic Solution)

Each lithium salt of organofluorosilicon compounds obtained in Examples 1 to 6 was dissolved in a propylene carbonate solvent to prepare an electrolytic solution of 1M (mol/l).

(Production of Positive Electrode 403)

Lithium carbonate and cobalt carbonate were mixed in a molar ratio of 1:2. The resulting mixture was heat treated in air stream at 800° C. to prepare lithium-cobalt oxide. 92% of this lithium-cobalt oxide, 3% of actylene black carbon powder and 5% of polyvinylidene fluoride powder were added to N-methyl-2-pyrrolidone to prepare a paste. This paste was coated on a collector which was an aluminum foil having an expanded metal shape, dried and then dried under reduced pressure at 150° C. to prepare a positive electrode 403.

(Preparation of Negative Electrode 402)

95% of natural graphite fine powder heat treated in an argon gas stream at 2000° C. and 5% of polyvinylidene fluoride powder were added to N-methyl-2-pyrrolidone to prepare a paste. This paste was coated on a collector which was a copper foil, dried, and then dried under reduced pressure at 150° C. to prepare a negative electrode 402.

(Separator)

Microporous separator of polyethylene was used.

(Fabrication of Battery)

A separator 407 having an electrolytic solution maintained therein was interposed between the negative electrode 402 and the positive electrode 403 in an argon gas atmosphere, and the resulting laminate was inserted in the positive electrode can 406 made of a titanium clad stainless steel material. The positive electrode 406 thus obtained was covered with the insulating packing 410 made of polypropylene and the negative electrode cap 405 made of titanium clad stainless steel material, followed by caulking, to obtain a lithium secondary battery.

Figure 2:
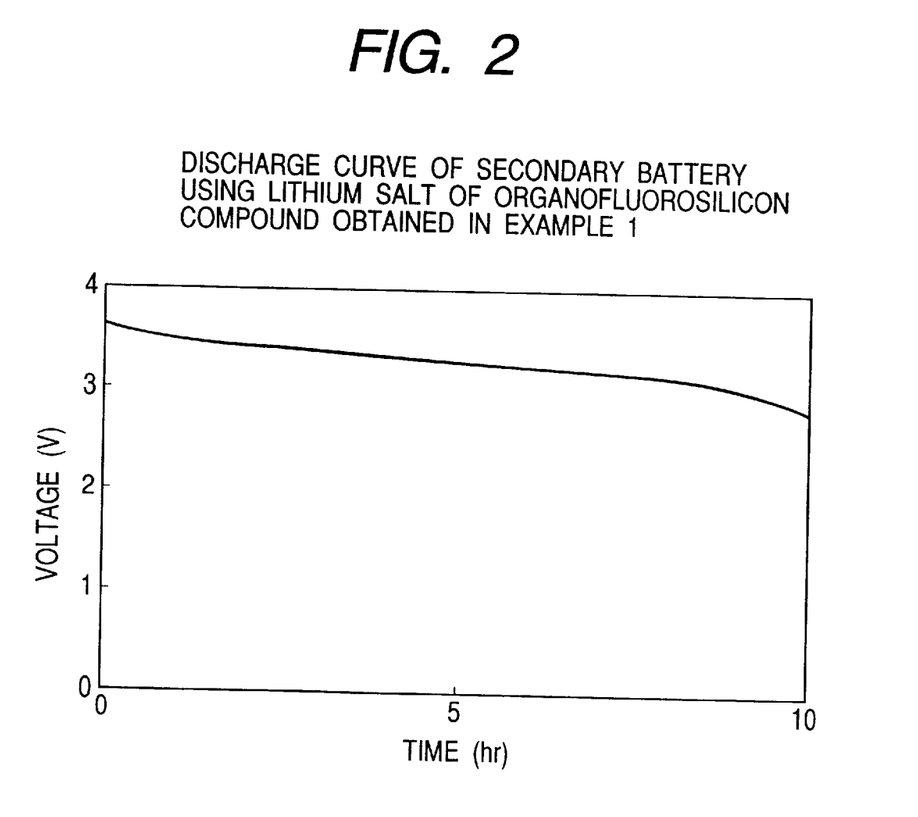
FIG. 2 is a view showing a discharge curve of a lithium secondary battery using the electrolyte obtained in the working example of the present invention.

FIG. 2 shows a discharge curve at a discharge current of 0.4 mA of a secondary battery using lithium salt of organofluorosilicon compound obtained in Example 1. Good charge and discharge performance was obtained. Lithium salt of organofluorosilicon compounds obtained in other Examples also provided good charge and discharge performance as in Example 1.

As described above, the method for producing the electrolyte according to the present invention makes it possible to produce an electrolyte which results in a lithium secondary battery having small performance deterioration due to repeated charge and discharge, and a long cycle life, with a low amount of impurities in high yield.

What is claimed is:

1. A method for producing an electrolyte comprising a salt of an organofluorosilicon containing silicon, fluorine and carbon, which comprises the step of reacting an organosilane compound containing at least silicon and carbon, with a fluorine compound in a solvent comprising a nonaqueous solvent.

2. The method for producing an electrolyte as claimed in claim 1, wherein said electrolyte is an electrolyte used in a secondary battery in which an intercalating reaction and a deintercalating reaction of lithium is utilized to charge and discharge.

3. The method for producing an electrolyte as claimed in claim 1, wherein the salt of the organofluorosilicon compound is synthesized in the step of reacting the organosilane compound with the fluorine compound.

4. The method for producing an electrolyte as claimed in claim 1, wherein said solvent contains 95% by weight or more of the nonaqueous solvent.

5. The method for producing an electrolyte as claimed in claim 1, wherein said solvent can dissolve the organosilane compound and the fluorine compound.

6. The method for producing an electrolyte as claimed in claim 5, wherein said solvent has a relative dielectric constant of 3 or more at 20° C.

7. The method for producing an electrolyte as claimed in claim 1, wherein said nonaqueous solvent is an organic solvent.

8. The method for producing an electrolyte as claimed in claim 6, wherein said nonaqueous solvent is at least one aprotic solvent selected from the group consisting of ethers, ketones, esters, amides, nitriles, amines, halogen compounds, nitro compounds, and sulfur compounds.

9. The method for producing an electrolyte as claimed in claim 1, wherein said fluorine compound is a fluoride salt.

10. The method for producing an electrolyte as claimed in claim 9, wherein said fluoride salt is ammonium fluoride salt.

11. The method for producing an electrolyte as claimed in claim 10, wherein said organosilane compound and said ammonium fluoride salt are reacted to synthesize ammonium salt of an organofluorosilicon compound.

12. The method for producing an electrolyte as claimed in claim 3, which comprises conducting the steps of making the salt of the organofluorosilicon compound synthesized in an intermediate product, and then ion-exchanging a cation of said salt with an alkali metal cation.

13. The method for producing an electrolyte as claimed in claim 12, wherein said alkali metal cation is lithium ion.

14. The method for producing an electrolyte as claimed in claim 12, wherein said ion-exchanging step is at least one step selected from the group consisting of a step of directly ion-exchanging with a cation exchange resin or membrane, a step of exchanging with hydrogen ion by a cation exchange resin or membrane and then exchanging by neutralizing with the cation, and a step of mixing with the salt containing the ion in the solvent and cation-exchanging utilizing ion intensity or precipitate generation.

15. The method for producing an electrolyte as claimed in claim 1, wherein said organosilane compound is a compound having 1 to 3 substituents selected from the group consisting of halogen group, hydroxyl group, alkoxyl group, acyloxy group, allenoxy group, amino group and hydrogen, and the remaining substituent selected from the group consisting of alkyl group and aryl group, as one of the four substituents for silicon.

16. The method for producing an electrolyte as claimed in claim 15, wherein said organosilane compound has at least one phenyl group as one of the four substituents for silicon.

17. The method for producing an electrolyte as claimed in claim 1, wherein the step of reacting the organosilane compound with the fluorine compound is conducted under the condition that the number of fluorines is adjusted to 3 or less as substituents for silicon of the salt of the organofluorosilicon compound.

18. A method for producing a secondary battery having a structure that at least a positive electrode, a negative electrode and a separator are incorporated in a battery housing, wherein an intercalating reaction and a deintercalating reaction of a lithium ion are utilized to charge and discharge, which comprises the step of arranging the electrolyte obtained by said method as claimed in any of claims 1 to 17 in the battery housing.

* * * * *

UNITED STATES PATENT AND TRADEMARK OFFICE
CERTIFICATE OF CORRECTION

PATENT NO. : 6,277,525 B1  Page 1 of 1
DATED : August 21, 2001
INVENTOR(S) : Tomoya Yamamoto et al.

It is certified that error appears in the above-identified patent and that said Letters Patent is hereby corrected as shown below:

Column 4,
Line 27, "$R_nSiX_{4+n}$" should read -- $R_nSiX_{4-n}$ --; and
Line 59, "is absorbs" should read -- absorbs --; and
"difficulty" should read -- difficulty, --.

Column 5,
Line 5, "a" should be deleted; and
Line 67, "element" should be deleted.

Column 6,
Line 2, "per one silicon element," should read -- per silicon, --;
Line 12, "compound, and the fluorine compound" should read -- compound and the fluorine compound, --;
Line 51, "solvent" should read -- a solvent --;
Line 52, "other" should read -- substance other --; and
Line 62, "is" should be deleted.

Column 7,
Line 65, "substitution" should read -- a substitution --; and
Line 66, "is" should be deleted.

Column 16,
Line 11, "$LiClO_4$" should read -- $LiClO_4$ --.

Column 17,
Line 38, "lithium the salt" should read -- the lithium salt --.

Signed and Sealed this

Ninth Day of July, 2002

*Attest:*

*Attesting Officer*

JAMES E. ROGAN
*Director of the United States Patent and Trademark Office*